United States Patent [19]

Hieda et al.

[11] Patent Number: 5,576,841
[45] Date of Patent: Nov. 19, 1996

[54] SIGNAL PROCESSING SYSTEM USING EXTERNAL STORAGE DEVICE

[75] Inventors: Teruo Hieda; Koji Takahashi, both of Kanagawa-ken, Japan

[73] Assignee: Canon Kabushiki Kaisha, Tokyo, Japan

[21] Appl. No.: 371,596

[22] Filed: Jan. 12, 1995

Related U.S. Application Data

[63] Continuation of Ser. No. 720,913, Jun. 25, 1991, abandoned.

[30] Foreign Application Priority Data

Jun. 28, 1990 [JP] Japan .................................. 2-171591

[51] Int. Cl.⁶ ........................................... H04N 5/76
[52] U.S. Cl. ............................................. 386/46
[58] Field of Search ............................. 358/335, 342, 358/341, 343, 906; 360/19.1, 18, 22; 348/465, 468, 705; H04N 5/76

[56] References Cited

U.S. PATENT DOCUMENTS

| | | | |
|---|---|---|---|
| 4,523,236 | 6/1985 | Hayashi et al. | 358/341 |
| 4,688,105 | 8/1987 | Bloch et al. | 358/342 |
| 4,724,492 | 2/1988 | Kosaka et al. | 358/342 |
| 4,750,034 | 6/1988 | Lem. | |
| 4,873,580 | 10/1989 | Katoh et al. | 358/906 |
| 4,893,193 | 1/1990 | Nakamura et al. | 358/342 |
| 5,018,186 | 5/1991 | Kimura et al. | 358/343 |
| 5,019,922 | 5/1991 | Shiba | 360/27 |
| 5,046,004 | 9/1991 | Tsumura et al. | 360/32 |
| 5,099,337 | 3/1992 | Curry | 358/335 |

*Primary Examiner*—Thai Q. Tran
*Assistant Examiner*—Huy Nguyen
*Attorney, Agent, or Firm*—Robin, Blecker, Daley & Driscoll

[57] ABSTRACT

A signal processing system comprises a signal processing device which includes a connector and a plurality of kinds of external storage devices which are arranged to store respective different kinds of information signals. In this system, the plurality of kinds of external storage devices are selectively connectable to the signal processing device through the connector, the information signal is transmissible to the signal processing device through the connector from the external storage device connected to the signal processing device, and the signal processing device further includes a detecting circuit which is arranged to detect via the connector the kind of the external storage device connected to the signal processing device. The system thus allows the external storage devices having information of varied kinds to be connected through one and the same connector. Therefore, information of diverse kinds can be formed and processed without necessitating any complex system arrangement.

17 Claims, 8 Drawing Sheets

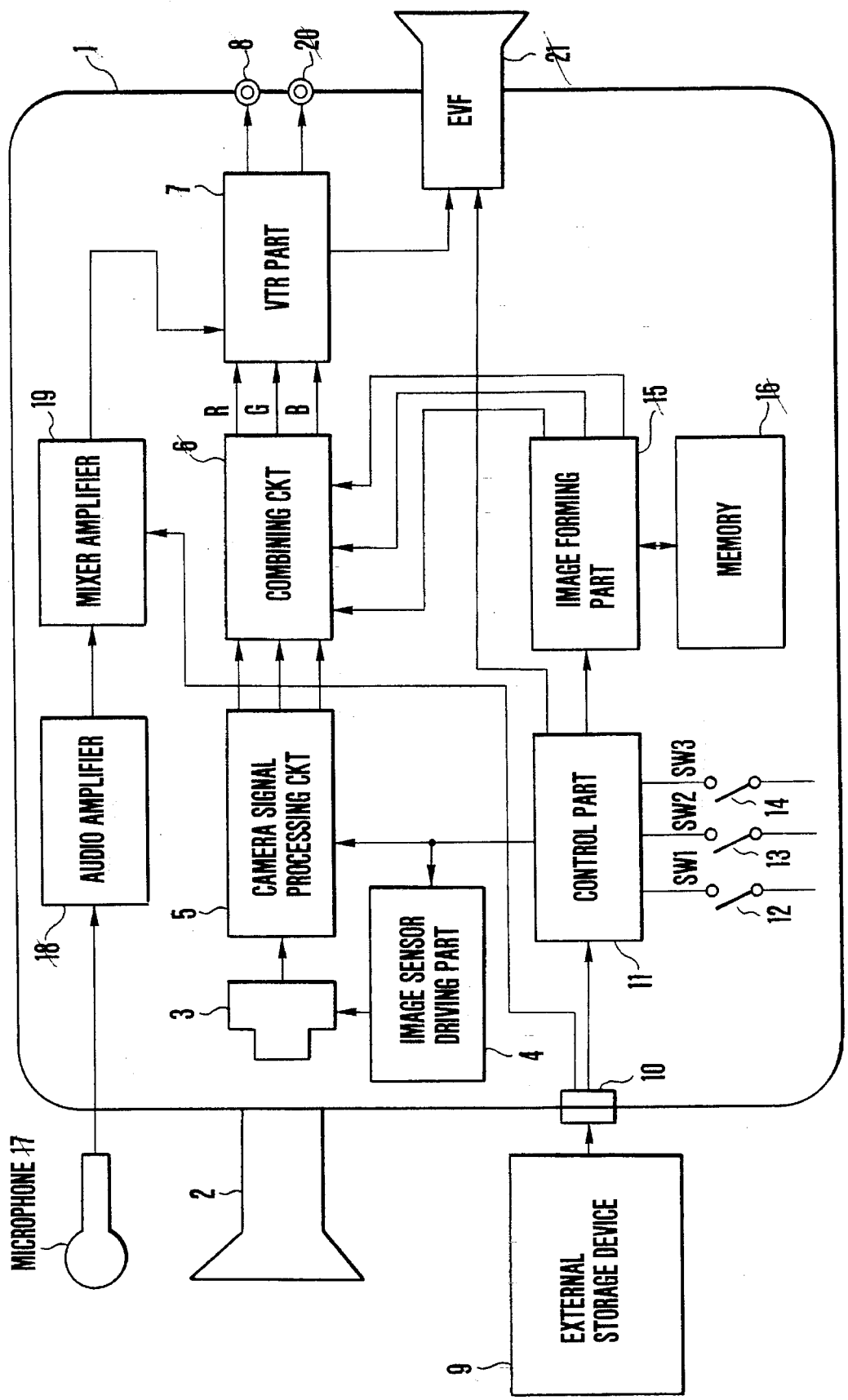

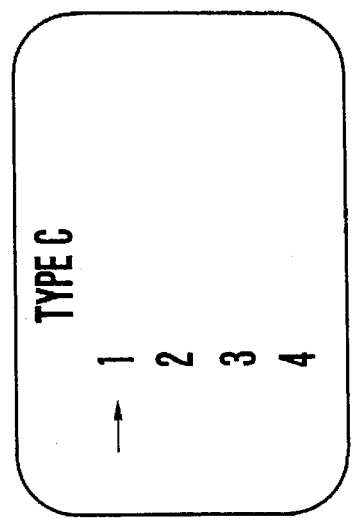
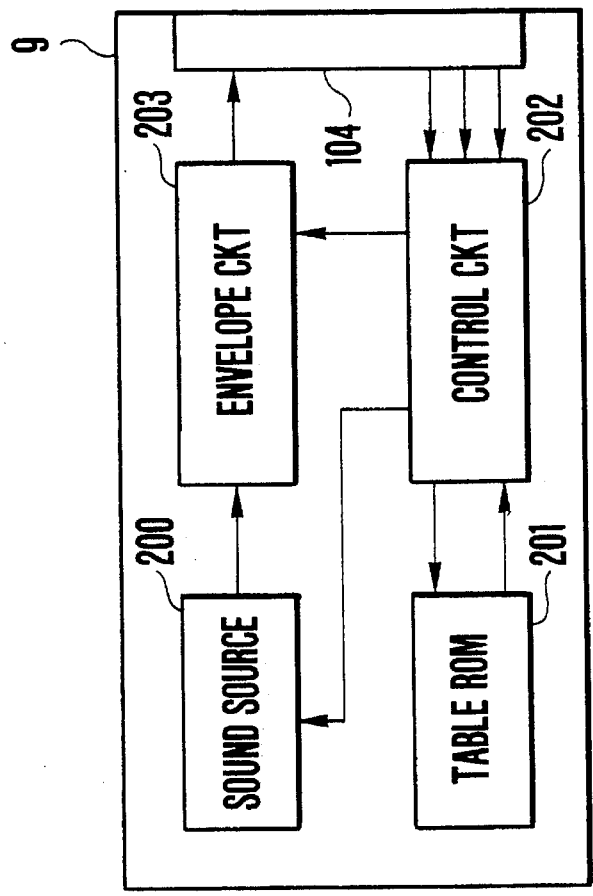

F I G. 6

| | ID0 | ID1 | ID2 |
|---|---|---|---|
| TYPE A | | | |
| TYPE B | 0 Ω | | |
| TYPE C | 0 Ω | | |
| | R0 Ω | R1 Ω | R2 Ω |

R1, R2: CONTENTS OF AUDIO SIGNAL IN TYPE C

SIGNAL PROCESSING SYSTEM USING EXTERNAL STORAGE DEVICE

This is a continuation of prior application Ser. No. 07/720,913, filed Jun. 25, 1991, now abandoned.

BACKGROUND OF THE INVENTION

1. Field of the Invention

This invention relates to a signal processing system having a signal processing device and an external storage device which is arranged to be attachable to and detachable from the signal processing device.

2. Description of the Related Art

In recording a video signal obtained by sensing images with a video camera and an audio signal obtained simultaneously with the video signal, many systems have been arranged to enhance the image effect of the record by superimposing or combining some other images such as letters, symbols, a specific picture or the like with the recording video signal and to multiplex background music or some effect sounds with the recording audio signal.

Among various known systems for combining video signals with other signals, a system of using a so-called character generator has been often employed. This system comprises a pattern ROM (read-only memory) which stores various patterns such as characters, symbols, etc. for a display as necessary; registers which are arranged to store information on the kind of a character to be displayed in every one of display positions; and a reading part which is arranged to read out the contents of the pattern ROM corresponding to the contents of the registers in accordance with horizontal and vertical synchronizing (sync) signals and to combine them with the video signal. Further, in displaying a character, the kind of the character to be displayed is written into the register of the display position by means of a microcomputer or the like.

In the case of another known system, the video signal obtained by sensing images is converted by an A/D (analog-to-digital) converter into a digital image signal of one to several bits. The digital image signal is stored in a memory arranged for every display picture element. Then, in accordance with the horizontal and vertical sync signals, the contents of the memory is serially read out to combine them with another video signal which is separately obtained by sensing images.

A further example of known systems comprises a graphic memory which corresponds to each picture element on a picture plane; a microcomputer which writes image data to be displayed into the graphic memory; and a reading circuit which reads out the contents of the graphic memory. The microcomputer is arranged to write the image data to be displayed into the graphic memory in accordance with a given program. The reading circuit is arranged to read out the image data in accordance with horizontal and vertical sync signals. The data thus read out is combined with a video signal obtained by shooting.

As regards the method for inserting some other audio signal into an audio signal obtained at the time of image sensing, a device for generating an audio signal such as a music record, a music tape, an electronic sound generator, or the like is used in many cases. After image sensing with a video camera, the audio signal obtained by the audio signal generating device is combined by means of a mixing amplifier or the like with sounds recorded as an audio signal on a tape along with a video signal while the audio signal recorded on the tape is reproduced.

Meanwhile, methods of varied kinds have been proposed for controlling a video camera including, for example, a method wherein: A memory or a microcomputer which is arranged to store, for example, aperture values, white balance adjustment values, focal points, electronic shutter time values, etc. is disposed within the video camera. A suitable combination of these values is then selected by means of a selection switch or the like for controlling the shooting operation of the camera.

However, discrete devices of varied kinds must be used for inserting a specific image into a video signal obtained by shooting, for inserting a given audio signal into the sounds obtained by shooting and for controlling the shooting operation of the video camera as mentioned above. In addition to that, connection lines are necessary for interconnecting these discrete devices. Therefore, it has been extremely difficult for general amateurs to carry out these inserting operations.

SUMMARY OF THE INVENTION

Under the above-stated background circumstances, it is an object of this invention to provide a signal processing system which permits diverse signals to be formed by a simple operation thereon to give versatile effects.

It is another object of this invention to provide a signal processing system which is arranged to permit use of information of diverse kinds stored in external storage devices by providing a signal processing device with only one connecting part to the external storage device.

Under this object, a signal processing system arranged as an embodiment of this invention comprises a signal processing device having a connector; and a plurality of kinds of external storage devices arranged to store respective different kinds of information signals. In this system, the plurality of kinds of external storage devices are selectively connectable to the signal processing device through the connector; the information signal is transmissible to the signal processing device through the connector from the external storage device connected to the signal processing device through the connector; and the signal processing device includes detecting means for detecting, through the connector, the kind of the external storage devices connected to the signal processing device through the connector.

It is a further object of the invention to provide a signal processing system which is arranged to process different kinds of information signals and to be capable of imparting diverse effects to the signals.

Under that object, a signal processing system arranged as another embodiment of the invention comprises a signal processing device which includes first and second connectors, video signal processing means for processing a video signal and audio signal processing means for processing an audio signal; a first external storage device which stores image information; and a second external storage device which stores sound information. In the system, the first and second external storage devices are arranged to be simultaneously connectable to the signal processing device through the first and second connectors.

These and further objects and features of this invention will become apparent from the following detailed description of embodiments thereof taken in connection with the accompanying drawings.

BRIEF DESCRIPTION OF THE DRAWINGS

FIG. 1 is a block diagram showing in outline the arrangement of a video camera system which is arranged as a first embodiment of this invention. FIGS. 4(A) and 4(B) show a further example of the external storage device of the same embodiment. FIG. 6 shows the values of detecting resistors connected between the ground and the detection terminals of connectors of the external storage devices shown in FIGS. 2(A) to 2(D), FIGS. 3(A) to 3(D) and FIGS. 4(A) and 4(B).

DETAILED DESCRIPTION OF THE PREFERRED EMBODIMENTS

Figure 2A:
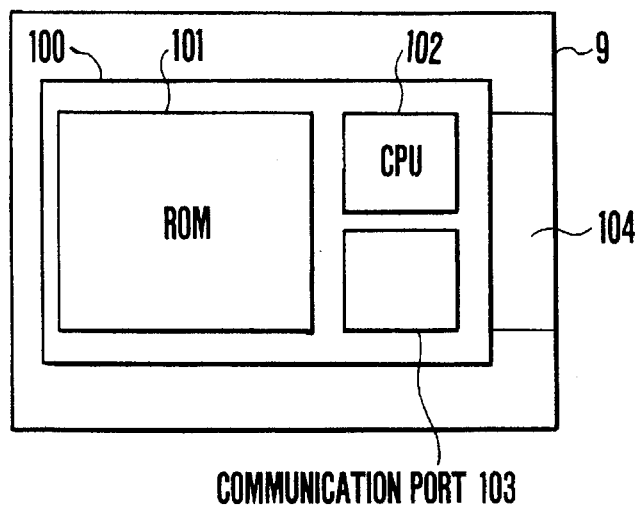
FIGS. 2(A) to 2(D) show an example of an external storage device which is included in the same embodiment.

The following describes the details of embodiments of this invention:

FIG. 1 is a block diagram showing in outline the arrangement of a video camera system which is arranged according to this invention as a first embodiment thereof. The illustration includes the body 1 of a VTR-integrated video camera; a photo-taking lens 2; an image sensor 3; an image sensor driving part 4; a camera signal processing circuit 5; a combining circuit 6 for combining a title signal with a video signal; a VTR part 7; an output terminal 8 for the video signal; an external storage device 9 which is arranged to be connected to the video camera body 1; a connection part 10 which is arranged to permit mounting or demounting the external storage device 9 on or from the video camera body 1; a control part 11 which is arranged to control the external storage device 9, an exchange of data, the image sensor driving part 4, the camera signal processing circuit 5, switches and an information display to be made on an electronic viewfinder 21, etc.; switches 12, 13 and 14; an image forming part 15 which is arranged to form a title signal; a writable and readable memory 16 which is arranged to store image data included in title data obtained from the external storage device 9; a microphone 17 which is mounted on a part of the camera body 1 and is arranged to record sounds; an audio amplifier 18; a mixer amplifier 19 which is arranged to combine an audio signal obtained from the external storage device 9 with the output of the audio amplifier 18; an audio output terminal 20; and the electronic viewfinder (hereinafter referred to as EVF) 21 which is arranged to display a recording or reproducing image and character information on the state of operation.

An object to be picked up is imaged by the photo-taking lens 2 on the image sensor 3. The image is photo-electrically converted into an image signal and is then supplied to the camera signal processing circuit 5. The image sensor 3 is arranged to perform a predetermined image sensing action in accordance with timing pulses output from the image sensor driving part 4. The camera signal processing circuit 5 performs a predetermined processing action on the image signal and produces a video signal. The video signal is supplied to the combining circuit 6 to be combined with a title signal which will be described later, before it is recorded at the VTR part 7. Further, at the time of reproduction, the video signal output from an video signal output terminal 8 is supplied to the input terminal of an external apparatus such as a TV monitor or the like.

Meanwhile, an audio signal obtained by means of the microphone 17 is amplified by the audio amplifier 18. The amplified audio signal is supplied to the mixer amplifier 19 to be combined with another audio signal which is generated by the external storage device 9 as will be described later herein. The composite audio signal which is thus obtained is recorded by the VTR part 7 either in a predetermined audio track or in an audio recording band along with the above-stated composite video signal. The control part 11 operates according to the states of the switches 12 to 14, the kind, state and data of the external storage device 9 connected to the connection part 10, and controls the supply of data to the image forming part 15, and the actions of the image sensor driving part 4, the camera signal processing circuit 5, etc. The control part 11 further sends characters or the like as information on the states of these parts to the EVF 21. Upon receipt of the data from the control part 11, the image forming part 15 writes the data into the memory 16. After that, the image forming part 15 forms an image signal by reading data out from the memory 16 according to an instruction coming from the control part 11. The image signal thus formed is supplied to the combining circuit 6 to be combined with the video signal. Further, the connection part 10 is arranged to permit the external storage devices 9 of varied kinds to be selectively mounted and demounted on and from the connection part 10.

FIGS. 2(A) to 2(D) show an example of the external storage device 9 of this embodiment. Of these figures, FIG. 2(A) shows the arrangement of the external storage device. The illustration includes a microcomputer 100; a ROM 101 which is disposed within the microcomputer 100; a CPU 102 which is also disposed within the microcomputer 100; a serial communication port 103 which is also disposed within the microcomputer 100; and a connector 104 which is arranged to connect the external storage device 9 to the camera body 1. With the external storage device 9 arranged in this manner, when a reading address is sent from the camera body 1 via the connector 104 and the communication port 103, the external storage device 9 sends data stored within the ROM 101 at a part corresponding to the reading address to the camera body 1 through the serial communication port 103 and the connector 104.

Figure 2B:
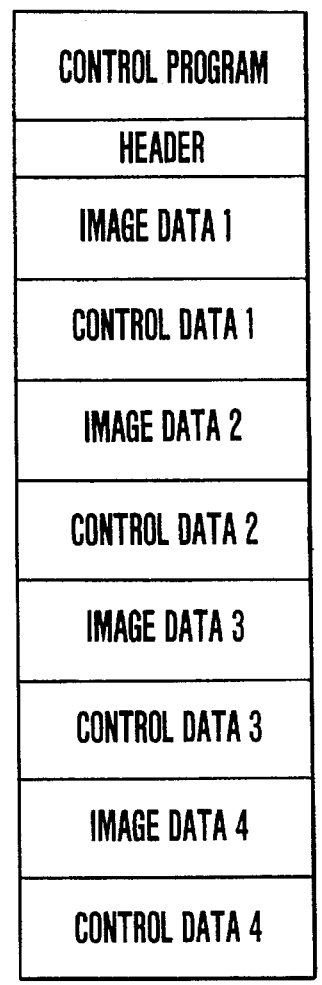

FIG. 2(B) shows data stored within the ROM 101 of FIG. 2(A). Referring to FIG. 2(B), a control program for the above-stated data reading action is stored in a leader part of the addresses. After the leader part, is provided a header part which includes data indicating the kind of the external storage device, the kind of data stored and data indicating a leader address of each data, etc. The header part is followed by image data 1, control data 1, image data 2, control data 2, etc. A given number of image data and control data are stored at each of addresses in this manner.

Figure 2C:
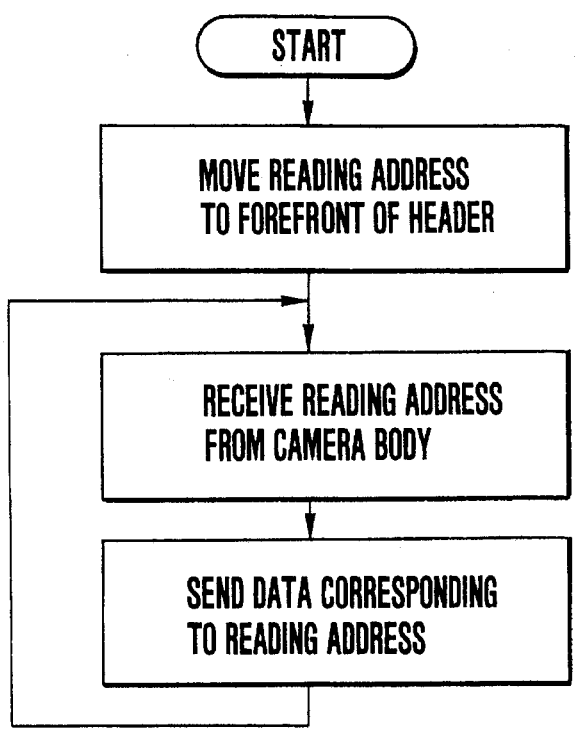

FIG. 2(C) is a flow chart showing the operation of the microcomputer 100 of FIG. 2(A). Referring to FIG. 2(C), the reading address is first shifted to the forefront of the header part after the start of operation. This makes the external storage device 9 fit for an action to be performed on the side of the camera body 1 for detecting the kind of the external storage device 9 as will be further described later. After this, information on the reading address sent from the camera body 1 is received. Then, data corresponding to the reading address is sent to the camera body 1. These steps are repeated.

Figure 2D:
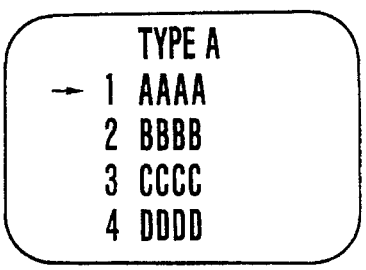

FIG. 2(D) shows the state of an information display made within the EVF 21 when the external storage device 9 is connected to the connection part 10 of the camera body 1. Referring to FIG. 2(D), the kind of the external storage device 9 is displayed in a easily noticeable part such as an upper part. In this instance, the kind of the external storage device 9 is displayed as "TYPE A". Below the kind of the external storage device 9, the contents of data in storage are displayed by item numbers with a suitable mark such as an arrow attached to an item number which is currently active. Further, as shown, the indexes of the items read out from the external storage device 9 are shown on the one side of the item numbers, for example, as "AAAA", "BBBB", etc. The operator is thus enabled to readily know the kind of the external storage device 9 currently in connection and the item number of data currently in process.

Figure 3A:
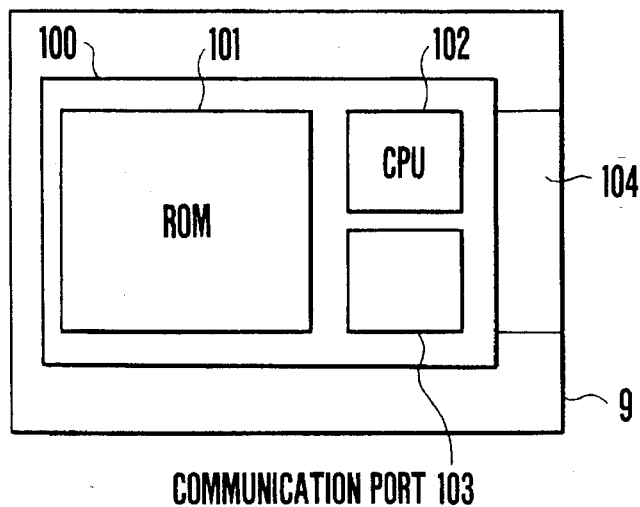
FIGS. 3(A) to 3(D) show another example of the external storage device of the same embodiment.

FIGS. 3(A) to 3(D) show another example of the external storage device 9 of this embodiment. FIG. 3(A) shows the arrangement of the external storage device. As apparent from FIG. 3(A), the structural arrangement of this example is identical with that of the example shown in FIG. 2 (A).

Figure 3B:
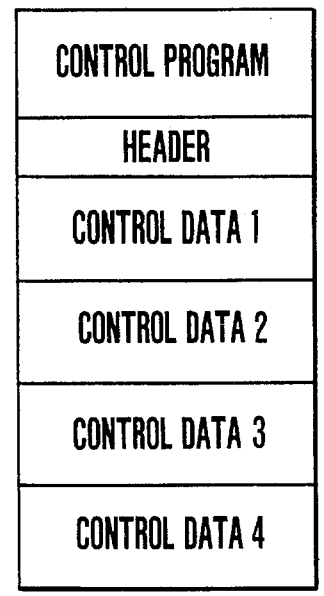

FIG. 3(B) shows data stored within the ROM 101 of FIG. 3(A). As shown, a control program for data reading is stored in a leader part of the addresses. After the control program, a header part which is similar to the header part of the FIG. 2(B) is stored and followed by control data 1, control data 2, etc. A given number of control data are thus stored at each of addresses.

Figure 3C:
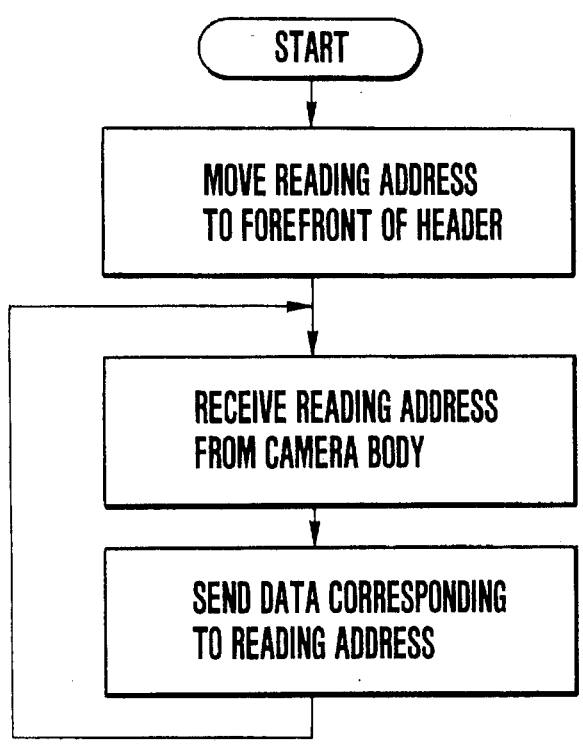

FIG. 3(C) is a flow chart showing the operation of the microcomputer 100 of FIG. 3(A). After the start of operation, the reading address is shifted to the forefront of the header part to make the external storage device 9 fit for an action to be performed on the side of the camera body 1 for detecting the kind of the external storage device 9. After that, a reading address sent from the camera body 1 is received. In response to this, the control data of the applicable reading address is sent to the camera body 1. These steps are repeatedly executed.

Figure 3D:
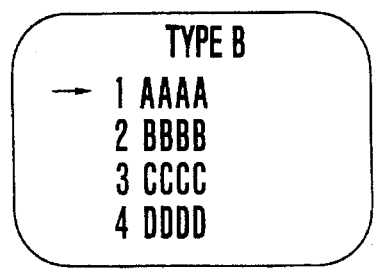

FIG. 3(D) shows the state of an information display made within the EVF 21 when the external storage device 9 is connected to the connection part 10 of the camera body 1. This display is made in the same manner as the display made when the external storage device of FIG. 2(A) is connected to the connection part 10. In other words, the kind of the external storage device 9 is shown in an easily noticeable part such as an upper part, as "TYPE B", in this instance. The contents of data stored within the external storage device 9 are displayed by item numbers below "TYPE B".

FIGS. 4(A) and 4(B) show a further example of the external storage device 9 of the system of this embodiment. Referring to FIG. 4(A) which shows the arrangement of the external storage device, the external storage device 9 comprises a sound source 200, a table ROM 201; a control circuit 202; and an envelope circuit 203. The control circuit 202 controls, according to the contents of the table ROM 201, the tone and length of the sound of the sound source 200 and the envelope circuit 203 to form a given audio signal for music, effect sounds, etc. The audio signal thus obtained is sent out via the connector 104 to the camera body 1.

FIG. 4(B) shows the state of an information display made within the EVF 21 when the external storage device 9 is connected to the connection part 10 of the camera body 1. As shown, like in the cases of the external storage devices shown in FIGS. 2(A) and 3(A), the kind of the external storage device is shown, in this case, as "TYPE C". However, since there is no index data in the case of this example, only item numbers are displayed with a mark such as an arrow attached to the item number which is currently active.

Figure 5:
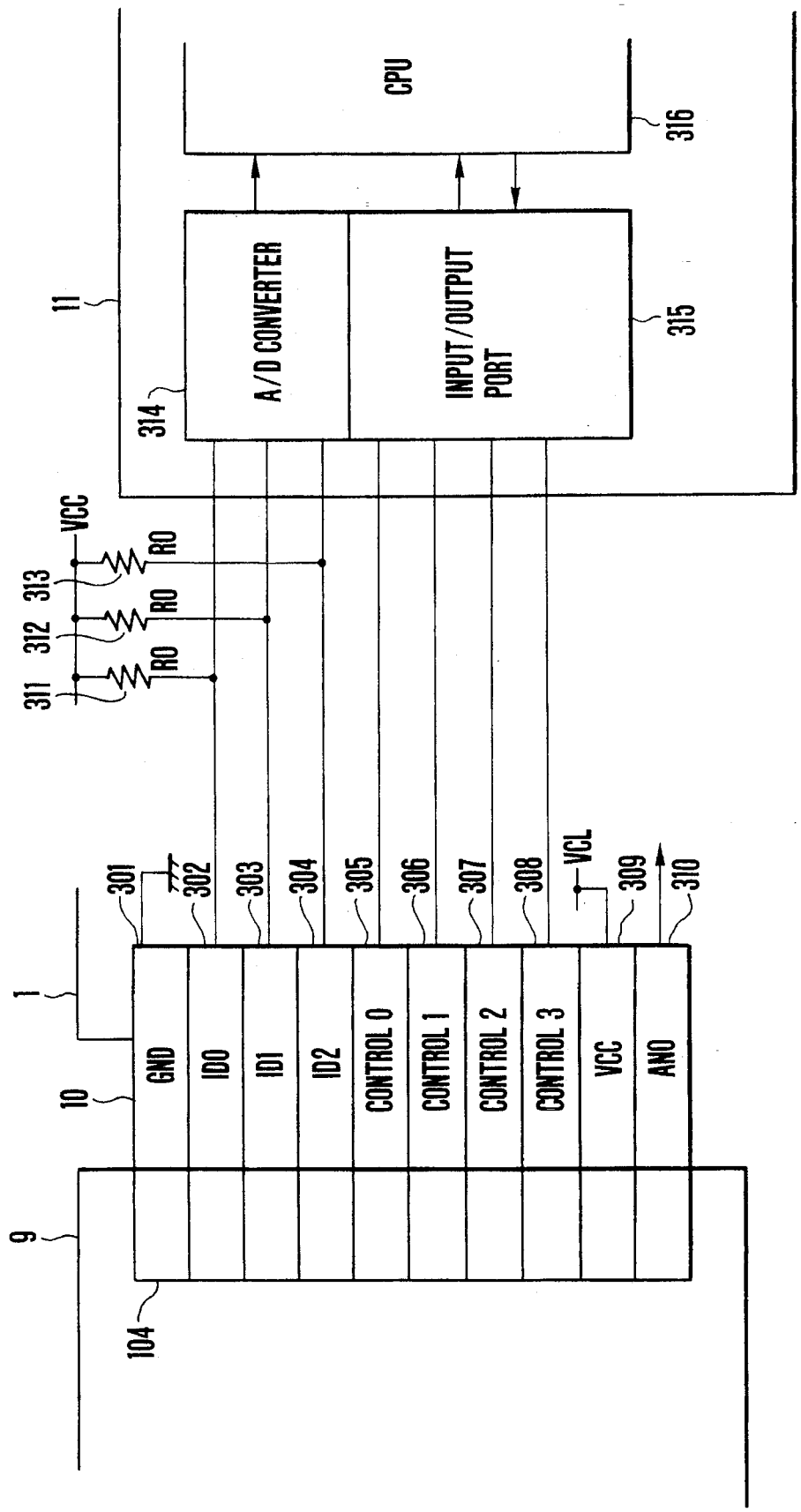
FIG. 5 is a diagram showing the details of a connecting part and the details in part of a control part included in the video camera system shown in FIG. 1.

FIG. 5 shows the connection part 10 and the details in part of the control part 11 of the video camera system shown in FIG. 1. Referring to FIG. 5, the connection part 10 is arranged to cause the connector 104 of one of a plurality of external storage devices 9 such as those described above to be selectively and electrically connected to the camera body 1. The connection part 10 comprises a ground terminal (GND) 301; a detection terminal 0 (ID0) 302; a detection terminal 1 (ID1) 303; a detection terminal 2 (ID2) 304; a control terminal 0 (CONTROL0) 305; a control terminal 1 (CONTROL1) 306; a control terminal 2 (CONTROL2) 307, a control terminal 3 (CONTROL3) 308; a power supply terminal (VCC) 309; and an audio signal output terminal (ANO) 310.

The detection terminal 0 (302), the detection terminal 1 (303) and the detection terminal 2 (304) are connected to a power supply VCC respectively via resistors 311, 312 and 313 which have a given resistance value R0 and are also connected to the input terminals of an A/D converter 314 which is disposed within the control part 11. When the external storage device 9 is connected to the camera body 1, a CPU 316 reads the voltage values of the terminals 302, 303 and 304 through the A/D converter 314. The control terminals 0 to 3 (305 to 308) are connected to an input/output port 315 of the control part 11 and are arranged to exchange data according to the kind of the external storage device 9 in the above-stated manner and to send out operation control signals. Further, the audio signal which is received from the audio signal output terminal 310 is combined by the mixer amplifier 19 shown in FIG. 1 with an audio signal which is received from the microphone 17 shown also in FIG. 1.

FIG. 6 shows the resistance values of the resistors connected between the ground terminal 301 and the detection terminals 0 to 2 (302 to 304) arranged at the connector 104 in each of the external storage devices 9 shown in FIGS. 2(A) to 2(D), 3(A) to 3(D), 4(A) and 4(B).

The external storage devices shown in FIGS. 2(A) to 2(D) and 3(A) to 3(D) are arranged to receive and send data through the communication port 103 and the input/output port 315. Meanwhile, the external storage device shown in FIGS. 4(A) and 4(B) is arranged to output only an audio signal only via the audio signal output terminal 310. The detection terminal 0 is provided for a discrimination between the external storage device shown in FIGS. 2(A) to 2(D) or in FIGS. 3(A) to 3(D) and the external storage device shown in FIGS. 4(A) and 4(B). The detection terminal 0 (302) is connected to a 0 ohm resistance if the external storage device connected to the connection part 10 is the device shown in FIGS. 2(A) to 2(D) or in FIGS. 3(A) to 3(D) and to an R0 ohm resistance if it is the device shown in FIGS. 4(A) and 4(B). Further, the detection terminals 1 and 2 (303 and 304) are arranged to show the storage contents of an external storage device having no communication output like the device shown in FIGS. 4(A) and 4(B). For example, a given resistance of R1 or R2 ohms is connected according to the number of pieces of music or the like stored. The control part 11 is arranged to be capable of reading the values of resistors connected to the detection terminals 0, 1 and 2 (302, 303 and 304) as the values of voltage supplied to the A/D converter 314.

Figure 7:
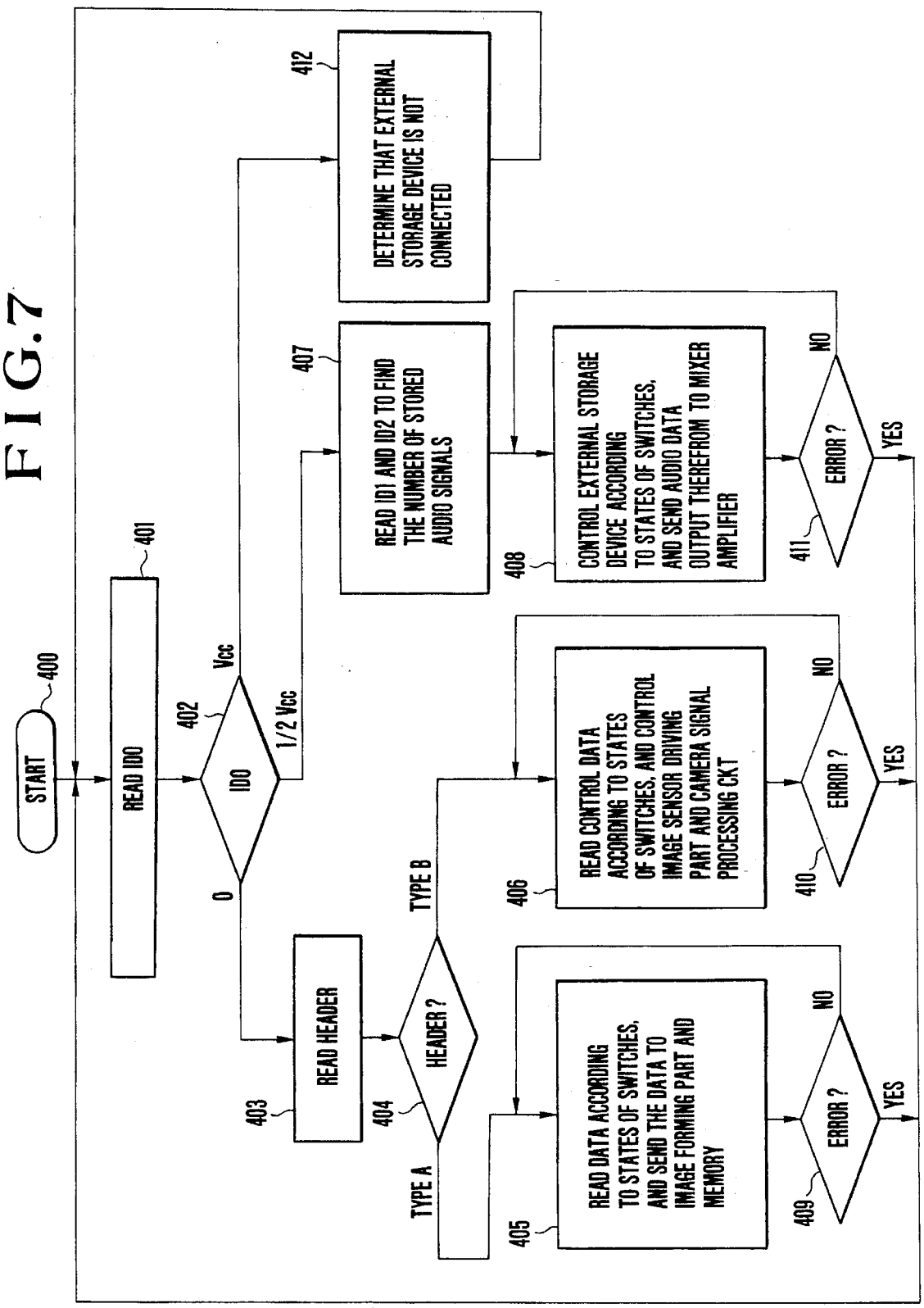
FIG. 7 is a flow chart showing the operation of the control part of the video camera system shown in FIG. 1.

FIG. 7 is a flow chart showing the operation of the control part 11 included in the video camera system shown in FIG. 1. The operation is as described below:

The operation starts at a step 400. At a step 401: The value ID0 of the detection terminal 0 is first read through the A/D converter 314. At a step 402: The value ID0 is checked. If the value ID0 is found to be "0", the external storage device in connection with the connection part 10 is considered to be of the kind inputting and outputting data through the input/ output port 315 as mentioned above. In that case, the flow of operation comes to a step 403. At the step 403: The data of the header part shown in FIG. 2(B) or 3(B) is read out through data communication with the external storage device. Step 404: A code indicating the kind of data stored within this header part (i.e., the kind of the external storage device) is read through the input/output port 315. A process ensuing on the step 404 is determined according to this code as follows:

If the external storage device shown in FIGS. 2(A) to 2(D) is determined to be in connection at the step 404, the flow comes to a step 405. At the step 405: The data stored within the external storage device 9 is read out according to the states of the switches 12, 13 and 14. Then, as mentioned in the foregoing, the image data is sent to the image forming part 15 to be written into the data memory 16. At the same time, the image forming part 15 is controlled by control data to obtain a title signal by setting the color, display position, etc. of the image of a title. The title signal which is formed in this manner is supplied to the combining circuit 6 to be combined with a video signal which comes from the camera signal processing circuit 5. The video signal which is thus combined with the title signal at the combining circuit 6 is supplied to the EVF 21 together with a display signal which is output from the control part 11 indicating the kind, the number and contents of the data stored, the operating state, etc. of the external storage device. As a result, a display is made in a manner as shown in FIG. 2(D). During this display process, the flow of operation either comes to a step 409 to detect any error made in the communication or mounting and demounting of the external storage device (a change in the value ID0) or the action of the step 405 is continuously executed until the operation of the external storage device is brought to a stop by the operation of the switch 12, 13 or 14, etc. In the event of occurrence of an error, the flow comes back to the step 401.

If the external storage device in connection is found to be the device shown in FIGS. 3(A) to 3(D) at the step 404, the flow comes to a step 406. At the step 406: Data stored within the external storage device is read out according to the states of the switches 12, 13 and 14. Then, the image sensor driving part 4, the camera signal processing circuit 5 are controlled. The action of the electronic shutter, a white balance adjusting action, a high-luminance compressing action, a gamma characteristic, a contour emphasizing action, etc. are determined. Further, like at the step 405, an action is performed to display the kind, the number and contents of the data stored and the operating state of the external storage device within the EVF 21, as shown in FIG. 3(D). Further, like the step 405, the action of the step 406 is either brought to a stop or continuously repeated until an error is determined to have occurred at a step 410. If the occurrence of an error is detected at the step 410, the flow comes back to the step 401.

Further, if the value ID0 is found to be ½ VCC at the step 402, the external storage device of the kind shown in FIGS. 4(A) and 4(B) is determined to be in connection. In that case, the flow of operation comes to a step 407. At the step 407: Values ID1 and ID2 are read to find the number of audio signals stored within the external storage device. At a step 408: A control signal is sent to the external storage device according to the state of the switches 12, 13 and 14. This causes the external storage device to act to supply an audio signal to the camera body 1 via the audio signal output terminal 310. The audio signal thus received is combined by the mixer amplifier 19 with an audio signal output from the audio amplifier 18. Further, a display as shown in FIG. 4(B) is made on the EVF 21 showing the kind of the external storage device, information read from the values ID1 and ID2, the operating state of the device, etc. In this instance, the states of the values ID0, ID1 and ID2 are incessantly monitored like in other cases described. In the event of occurrence of any change, the change is considered to be an error at a step 411 and the flow comes back to the step 401.

In a case where the value ID0 is found to be VCC at the step 402, no external storage device is determined to be in connection at a step 412, so that the flow comes back to the step 401.

With the video camera system arranged in accordance with this invention in the manner as described in the foregoing, the system has the following advantages: The external storage devices of varied kinds can be connected to the camera body with only a single connection part 10 provided. The kind of the external storage device can be automatically detected. Therefore, all the diverse functions of these external storage devices can be utilized.

Figure 8:
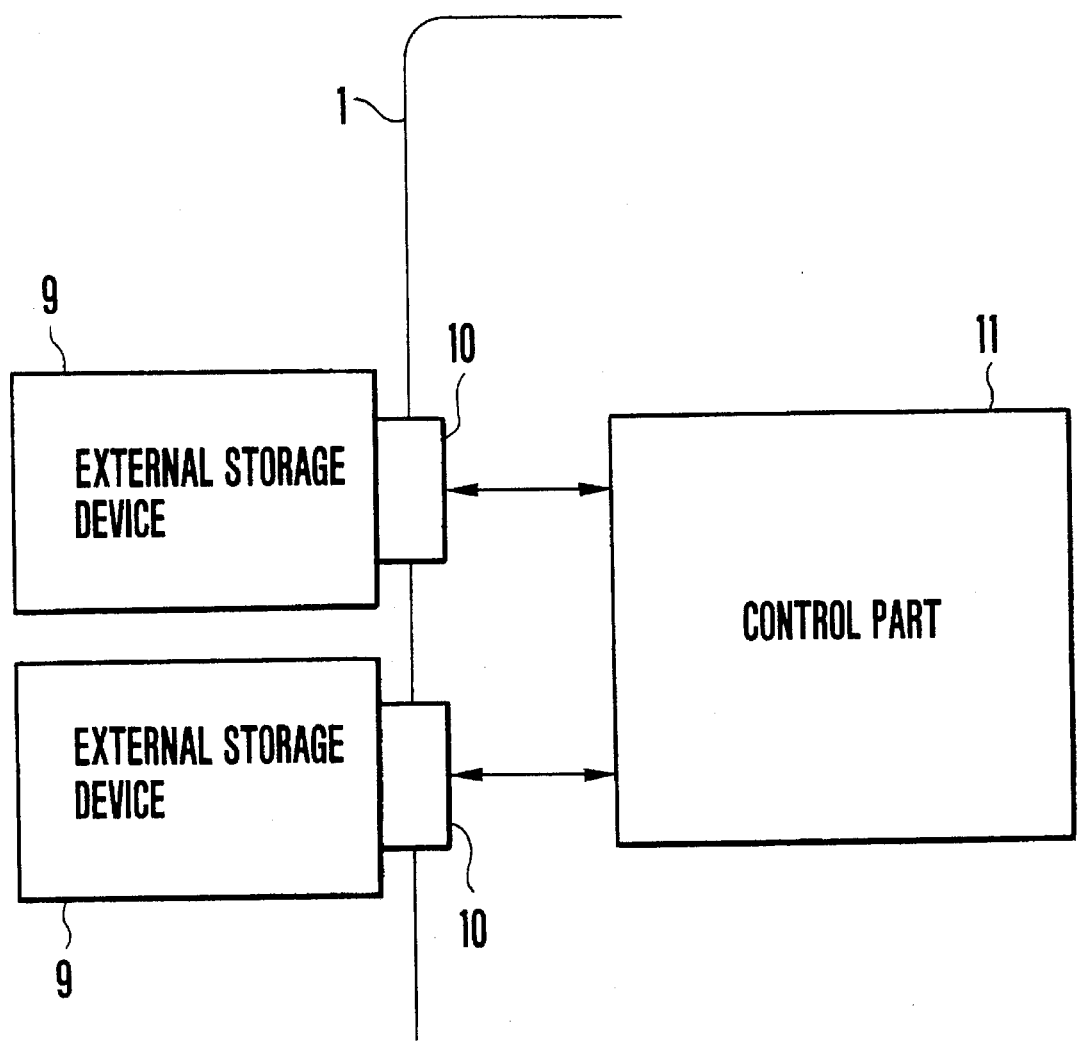
FIG. 8 is a block diagram showing the arrangement of the essential parts of a video camera system which is arranged as a second embodiment of this invention.

FIG. 8 shows in a block diagram the essential parts of a video camera system which is arranged according to this invention as a second embodiment thereof.

The second embodiment is provided with two connection parts which permit two external storage devices 9 to be simultaneously connected and to be simultaneously operable by a control part 11. This arrangement simultaneously gives advantageous effects of a plurality of kinds corresponding to a plurality of external storage devices. For example, in a case where the external storage device shown in FIGS. 2(A) to 2(D) and the external storage device shown in FIG. 4(A) and 4(B) are simultaneously connected to the camera body, it is possible to combine a given audio signal with sounds picked up while a given image is inserted in an image sensed by shooting.

In each of the embodiments described, the title signal formed by the image forming part 15 is arranged to be combined with the video signal obtained from a sensed image on the input side of the VTR part 7. However, this arrangement may be changed to combine the title signal with the video signal on the output side of the VTR part 7 or on both the input and output sides of the VTR part 7. With respect to the audio signal, it is possible to have an audio signal which is obtained from the external storage device combined with an audio signal output of the VTR part 7.

Further, the modes of displays that can be made within the EVF 21 of each of the embodiments are not limited to the modes described. The kind, the contents and the operating state of the external storage device can be displayed in various manners. Further, the contents of the external storage device shown in FIGS. 3(A) to 3(D) may be arranged to be usable for controlling not only the image sensor driving part 4 and the camera signal processing circuit 5 but also the aperture of the photo-taking lens 2, an automatic focusing action and also the operation of the VTR part 7. Further, while the embodiment described is arranged to make the display by the EVF 21, this may be changed to make a display by means of some other display element such as a liquid crystal display plate or the like.

As described in the foregoing, in accordance with this invention, external storage devices of a plurality of kinds can be connected to a common connection part. Therefore, a signal processing system can be arranged in accordance with this invention to be easily operable and to permit recording of versatile signals to give diverse effects without hindering reduction in size and weight of the system.

What is claimed is:

1. A signal processing system comprising:

(A) a plurality of kinds of storage devices, each comprising:
   a) storing means for storing information signals, said storing means being different in kinds according to the plurality of kinds of storing devices;
   b) holding means for holding information relative to the kinds of storing means, said holding means having resistance means having different resistance values according to the kinds of the storing means; and (B) signal processing means, comprising:
   a) a connection means to which said holding means of said storing devices is selectively connectable, said connection means receiving the information relative to the kinds of the storing means from the plurality of kinds of storing devices; and
   b) detecting means for detecting the resistance value of the resistance means of the holding means connected to the connection means so as to discriminate the kinds of the storing means connected to the connecting means on the basis of the detected resistance value.

2. A system according to claim 1, wherein said connection means has a plurality of terminals for each receiving the information relative to the kinds of the storing means and said detection means discriminates the kinds of the storing means on the basis of the resistance value of the resistance means connected to the plurality of terminals.

3. A system according to claim 1, wherein said signal processing means has read-out means which reads out the information signal from the storing means and receives the same through the holding means and the connection means on the basis of the discrimination results of the detection means.

4. A system according to claim 3, wherein said storing means of the plurality of kinds of storing devices each stores detected information indicating its own kind as the information signal.

5. A system according to claim 3, wherein said storing means is capable of supplying an image information signal as the information signal to said signal processing device via said input/output terminal, and wherein said signal processing device includes combining means for combining a video signal generated from said signal processing device with a video signal formed in accordance with the image information signal supplied from said first external storage device.

6. A system according to claim 3, wherein said storing means is capable of supplying a control information signal as the information signal to said signal processing device via said input/output terminal, and wherein said signal processing device includes control means for controlling various parts of said signal processing device in accordance with the control information signal.

7. A signal processing device to be set with a plurality of storing devices each having storing means and resistance means having different resistance values according to the kinds of the storing devices, comprising:
   a) connection means for connecting with the resistance means;
   b) detection means for detecting the resistance values of the resistance means connected to the connection means; and
   c) discrimination means for discriminating the kinds of the storing devices on the basis of detection results of the detection means.

8. An apparatus according to claim 7, wherein said connection means includes a plurality of connection terminals and said detection means detects resistance values of the resistance means connected to the plurality of connection terminals.

9. An apparatus according to claim 8, wherein said plurality of connection terminals include a ground terminal and a power source terminal.

10. An apparatus according to claim 7, further comprising read-out means for reading out an information signal stored in the storing means through the connection means on the basis of the discrimination results of the discrimination means, and signal processing means for processing the information signal read out by the read-out means.

11. An apparatus according to claim 9, wherein the information signal stored in the storing means includes a video signal.

12. An apparatus according to claim 10, further comprising generation means for generation of the video signal, wherein said signal processing means includes means for synthesizing the video signal read out from the storing means with the video signal from the generation means.

13. An apparatus according to claim 11, further comprising recording means for recording the video signal from the generation means, said recording means also recording the video signal synthesized by the synthesizing means.

14. An apparatus according to claim 9, further comprising display means for displaying video images relative to the video signals read out from the storing means.

15. A storing device for supplying information signals to a signal processing apparatus which discriminates the kind of a storing device set thereto and processes signals according to discrimination results, comprising:
   a) storing means for storing information signals, said storing means being provided in a plurality of kinds according to the kinds of the storing devices; and
   b) holding means for holding information relative to the kinds of the storing devices, said holding means including resistance means having different values according to the kinds of the storing devices, wherein said signal processing apparatus detects the resistance values of the resistance means and discriminates the kinds of the storing devices on the basis of the resistance values.

16. A device according to claim 15, wherein said storing means is capable of outputting the information signal from the storing means through the holding means according to the discrimination results of the signal processing apparatus.

17. A device according to claim 15, wherein the storing means stores video signals as the information signals.

* * * * *